United States Patent

Bouteiller et al.

[11] Patent Number: 5,525,381
[45] Date of Patent: Jun. 11, 1996

[54] ELECTRO-OPTICAL MATERIAL BASED ON POLYMER-DISPERSED LIQUID CRYSTAL, METHOD FOR THE PREPARATION THEREOF BY CHEMICAL MODIFICATION OF THE INTERFACE AND DEVICE BASED ON THIS MATERIAL

[75] Inventors: Laurent Bouteiller, Palaiseau; Pierre Le Barny, Orsay, both of France

[73] Assignee: Thomson-CSF, Paris, France

[21] Appl. No.: 223,675

[22] Filed: Apr. 6, 1994

[30] Foreign Application Priority Data

Apr. 6, 1993 [FR] France ................... 93 04053

[51] Int. Cl.⁶ .................................... C09K 19/52
[52] U.S. Cl. ................ 428/1; 252/299.01; 359/51; 359/52; 428/320.2; 428/321.5
[58] Field of Search .............. 428/1, 320.2, 321.5; 252/299.01; 359/51, 52

[56] References Cited

U.S. PATENT DOCUMENTS

| 5,155,793 | 10/1992 | Esselin et al. | 385/131 |
| 5,198,514 | 3/1993 | Le Barny et al. | 526/259 |
| 5,267,076 | 11/1993 | Broussoux et al. | 359/245 |
| 5,378,391 | 1/1995 | Nakatani | 428/1 |

FOREIGN PATENT DOCUMENTS

| 0357234 | 3/1990 | European Pat. Off. . |
| 0507204 | 10/1992 | European Pat. Off. . |
| WO91/13126 | 9/1991 | WIPO . |
| WO92/12219 | 7/1992 | WIPO . |

Primary Examiner—Nasser Ahmad
Attorney, Agent, or Firm—Oblon, Spivak, McClelland, Maier & Neustadt

[57] ABSTRACT

Disclosed is a novel type of composite electro-optical material based on liquid crystal dispersed in a polymer with reactive functional groups (Y). The originality of this material lies in the chemical modification of the interface between the polymer and the liquid crystal leading to the formation of a composite material comprising a porous network of polymer and liquid crystal molecules in the pores of the network. The polymer possesses reactive functional groups (Y) and functional groups (X) at the interface between the polymer and the liquid crystal. The totality constituted by the functional groups (Y) and the functional groups (X) enables the optimizing of the electro-optical performance characteristics obtained from this type of material. Also disclosed is a method to obtain this composite material as well as a device comprising a material such as this.

5 Claims, 2 Drawing Sheets

ELECTRO-OPTICAL MATERIAL BASED ON POLYMER-DISPERSED LIQUID CRYSTAL, METHOD FOR THE PREPARATION THEREOF BY CHEMICAL MODIFICATION OF THE INTERFACE AND DEVICE BASED ON THIS MATERIAL

BACKGROUND OF THE INVENTION

1. Field of the Invention

The invention relates to an electro-optical material based on liquid crystal dispersed in a polymer. This use of this type of material is particularly promising in the field of optical shutters and notably in the field of display screens.

2. Description of the Prior Art

The following is the electro-optical effect used in these composite materials: a film of composite material is generally sandwiched between two transparent, conductive electrodes. At rest, this film is a light-scattering film because of the differences in indices of refraction within the material. When a voltage is applied to the terminals of this film, the oblong-shaped liquid crystal molecules get oriented along their main axis parallel to the electrical field. By adjusting the ordinary index of the liquid crystal to the index of the polymer, a medium with a homogeneous index is obtained, and the film becomes transparent. It is thus possible to pass from a light-scattering state to a transparent state.

The use of these liquid crystal/polymer composite materials offers numerous advantages over other techniques of display. Indeed, these composite materials:

benefit from the ease of implementation of the polymers, which enables their easy deposition as thin films with controlled thickness on large surfaces;

do not necessitate any surface treatment of the substrates that form the screen;

work without any polarizer (whence an increase in gain);

show an electro-optical effect with an angle of view of 150°.

The existing techniques used for the application of these composite materials are notably of two types:

the first technique consists in making an emulsion of a liquid crystal (insoluble in water) in an aqueous phase that is polymer-rich (hydrosoluble polymer or latex) and then evaporating the water to solidify the emulsion;

the second technique consists in making a homogeneous mixture of a liquid crystal and of a polymer or precursor (that may contain a solvent of the liquid crystal which is also a solvent of the polymer), and then in bringing about the separation of the liquid crystal either by polymerizing it (in the case of a precursor) or by cooling it or again by evaporating the solvent if any.

In these composite materials, it has been shown that parameters such as the control voltage (needed for the flip-over of the liquid crystal molecules), the response time, the contrast and the phenomena of hysteresis depend directly on:

the geometrical factors of the composite material (the thickness of the film and the size and shape of the cavities filled by the liquid crystal);

the dielectric properties of the polymer (resistivity and dielectric constant);

the optical properties of the polymer (index of refraction);

the nature of the anchoring of the liquid crystal to the polymer.

Now, all these variables depend partially or exclusively on the nature of the polymer. Thus, for a given polymer, it is most usually necessary to bring about a compromise among the different parameters (such as control voltage, contrast etc.) to be obtained.

SUMMARY OF THE INVENTION

In order to have an additional degree of freedom enabling action on the performance characteristics obtained from this type of composite material in which liquid crystal molecules are dispersed, the invention proposes a novel composite electro-optical material. This is a material comprising a network constituted by a porous polymer (P) containing reactive functional groups (Y), and liquid crystal molecules ($\chi$L) in the pores of the network, the polymer network having functional groups (X), in contact with the liquid crystal molecules. A material such as this enables the functional groups (X) and (Y) to be chosen independently in order to optimize the electro-optical performance characteristics that can be obtained.

More specifically, an object of the invention is an electro-optical composite material based on polymer (P) and liquid crystal molecules ($\chi$L) said material comprising a porous network of polymer, the liquid crystal molecules ($\chi$L) being in the pores of the film, the polymers having chemical functional groups (Y) and having, at the liquid crystal/polymer interface, chemical functional groups (X).

The functional groups (Y) may advantageously be alcohols and the functional groups (X) may advantageously be esters.

An object of the invention is also a method for the preparation of this novel type of electro-optical material. More specifically, an object of the invention is also a method for the preparation of a film of electro-optical material based on polymer (P) and molecules of liquid crystal ($\chi$L), said method comprising the following steps:

the making of a porous film of polymer on a substrate (S), said polymer having reactive functional groups (Y);

the chemical conversion of the reactive functional groups (Y) of the polymer chains located at the interface between the polymer (P) and the pores of the network, so as to obtain polymer chains having functional groups (Y) in volume and polymer chains having functional groups (X) on the surface;

the inclusion of liquid crystal molecules ($\chi$L) in the pores of the film.

In the method according to the invention, the porosity of the film may advantageously be got by inclusions of liquid crystal ($\chi$L)o in the polymer, it being possible for said liquid crystal ($\chi$L)o to be eliminated before the step for the chemical conversion of the surface reactive functional groups (Y) into functional groups (X).

The porous film of polymer may advantageously be a reticulate polymer film thus giving high stability to the porous network.

The chemical conversion of the surface reactive functional groups may advantageously be carried out in a gas phase containing functional groups (Z) that are capable of generating functional groups (X).

The porous film of reticulate polymer may be made from a mixture (M)o of photopolymerizable monomer, photoinitiator and liquid crystal ($\chi$L)o. Preferably, the photopolymerizable monomer is polyfunctional for the formation, during the polymerization, of a network of reticulate polymer under the effect of an irradiation.

The mixture (M)o may advantageously be introduced by capillarity into a cell comprising two transparent electrodes, it being possible for the polymerization to be initiated by irradiation through one of the electrodes.

The molecules of liquid crystal ($\chi$L)o that have enabled the formation of pores may advantageously be eliminated by suction under vacuum. The chemical conversion of the surface reactive functional groups (Y) into functional groups (X) can thus be achieved. The new network of polymer comprising functional groups (Y) in volume and functional groups (X) on the surface is then preferably rinsed with a solvent before the porous film is filled again with a liquid crystal ($\chi$L) that may be the liquid crystal ($\chi$L)o.

Typically, in the case of a polymer (P) enclosing functional groups OH, the chemical conversion may be obtained by heterogeneous reaction with gaseous acid chloride.

Finally, an object of the invention is an electro-optical device comprising a film of composite material based on polymer (P) and particles of liquid crystal ($\chi$L) L) wherein:

the film is a porous film of polymer, the liquid crystal molecule ($\chi$L) being in the pores of the film;

the polymer (P) comprises functional groups (Y) and, at the interface between the polymer and the liquid crystal, functional groups (X).

The electro-optical device according to the invention may notably be a display screen designed for the projection of images working at the video rate or designed to work in direct viewing mode.

BRIEF DESCRIPTION OF THE DRAWINGS

The invention will be understood more clearly and other advantages will appear from the following description, given on a non-restrictive basis, and from the appended figures of which:

FIG. 2 illustrates the curves validating the method of making the display screen according to the invention and, notably, the step for the chemical conversion of the surface reactive functional groups (Y):

MORE DETAILED DESCRIPTION

The invention proposes an original composite material based on liquid crystal dispersed in a polymer that can easily be used in the form of a film. The polymers used show a chemical modification of their interface with the particles of liquid crystal, making it possible to optimize the nature of the anchoring of the liquid crystal molecules to the polymer. This optimization can thus be achieved independently of the voluminal properties of the polymer and hence make it possible to improve the addressing voltages and the response time and to reduce the phenomena of hysteresis.

The network constituted by the porous polymer may be prepared by the polymerization (photochemical or thermal polymerization, polycondensation etc.) of a mixture of monomers in a solvent of monomers that are not a solvent of polymer. At least one of the monomers may contain the functional group (Y) and the solvent is eliminated subsequently.

The network may also be prepared by polymerization of a mixture of monomers containing inorganic particles that are then dissolved selectively.

The network may also be prepared by polymerization of a mixture of polymers such that a gas is released during this polymerization.

The network may be enclosed between two transparent conductive electrodes that may be covered with a protective layer in order to be used in a device according to the invention.

It is possible to bring about the flow, through the network, of a mixture constituted by a reagent, which may possibly be a solvent (a solvent for the reagent and a non-solvent for the polymer) and a catalyst (if necessary), and then the polymer may be rinsed with a non-solvent and vacuum-dried. The network (whose geometrical, dielectric and optical properties have not been modified) is then covered on the surface with the chemical functional groups (X).

The network can then be filled with a mixture of liquid crystals (which may contain dopants such as dichroic dyes).

It is possible to choose reactive functional groups (Y) and reagents (Z) giving rise to functional groups (X) of great diversity on the polymer (P). Some examples are cited in the table 1.

TABLE 1

| REACTIVE FUNCTIONAL GROUP Y | REAGENT Z |
| --- | --- |
| alcohol | acid chloride |
| amine | epoxy |
| alcohol | chlorosilane |
| isocyanate | alcohol |
| ester | amine |

For one type of reactive functional groups (Y) and reagents (Z) chosen, it is possible to bring about variations, unlimitedly, in the chemical nature of the substituting agents present in (Z). As a result, it is possible to optimize the electro-optical properties of the composite material. For example, the table 2 shows some reagents (Z) that may be used in the case of the use of an acid chloride.

TABLE 2

REAGENT X

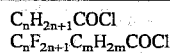

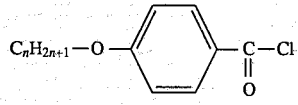

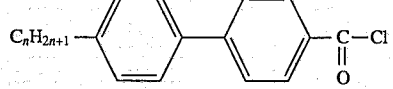

TABLE 2-continued

REAGENT X

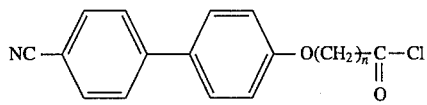

EXAMPLE 1

Figure 1:
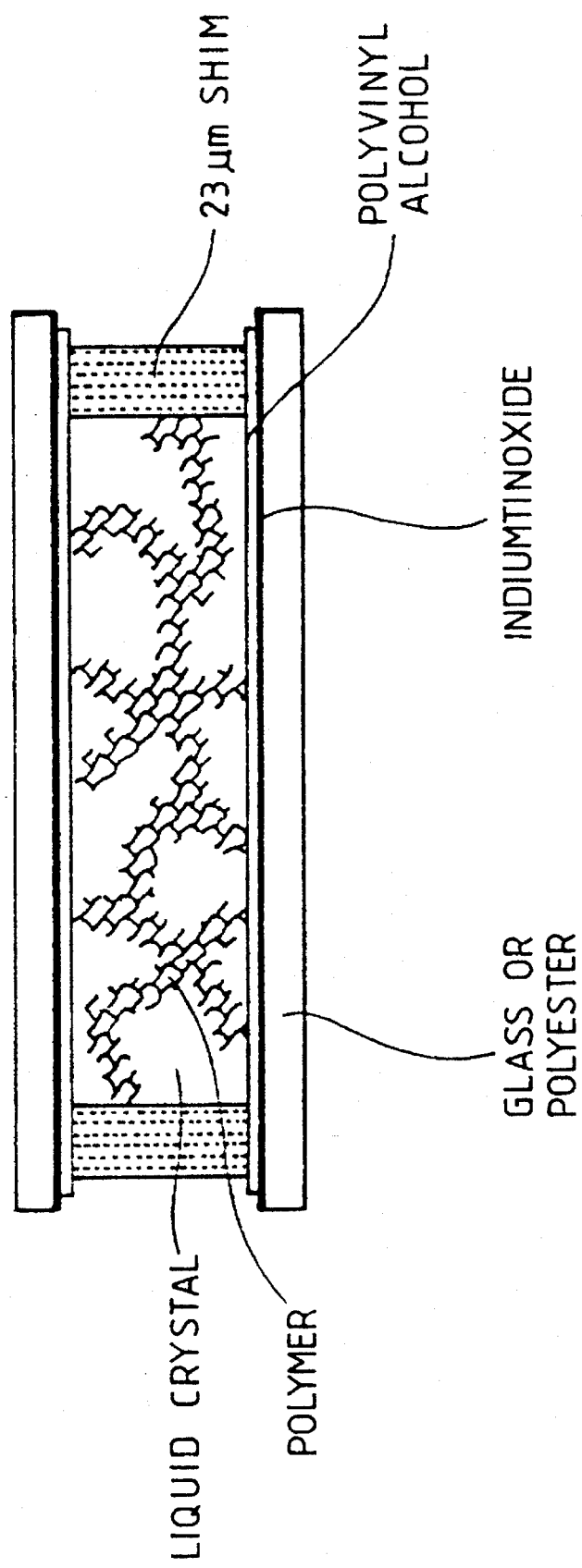
FIG. 1 shows a schematic view of an exemplary cell that comprises the electro-optical material according to the invention and that can be used in an electro-optical device.

The following homogeneous mixture is introduced into a cell (FIG. 1) constituted by two transparent conductive substrates (glass or polyester covered with indium tin oxide) protected by a layer of 0.6 μm of polyvinyl alcohol, and separated by 23 μm thickness shims:

95% of liquid crystal BL012 (Merck BDH), 3.9% of the mixture of acrylic monomers Kayarad HX 620 (Nippon Kayaku);

1% of 2-hydroxyethyl acrylate (Aldrich);

0.1% of the photo-initiator Darocure 1173 (Merck).

The cell is irradiated with a mercury vapor lamp (9 mW/cm$^2$ at 365 nm for 15 minutes) to obtain a network of polymer with open pores bathed by the liquid crystal.

The liquid crystal is eliminated under vacuum, and then the cell is put into contact (under 9 mm of mercury, at 60° C., for two hours) with gaseous benzoic para-butyl acid chloride (Aldrich).

The network is then rinsed with ether (which does not make the network expand), vacuum dried for two hours and again filled with the liquid crystal BL012.

Figure 2A:
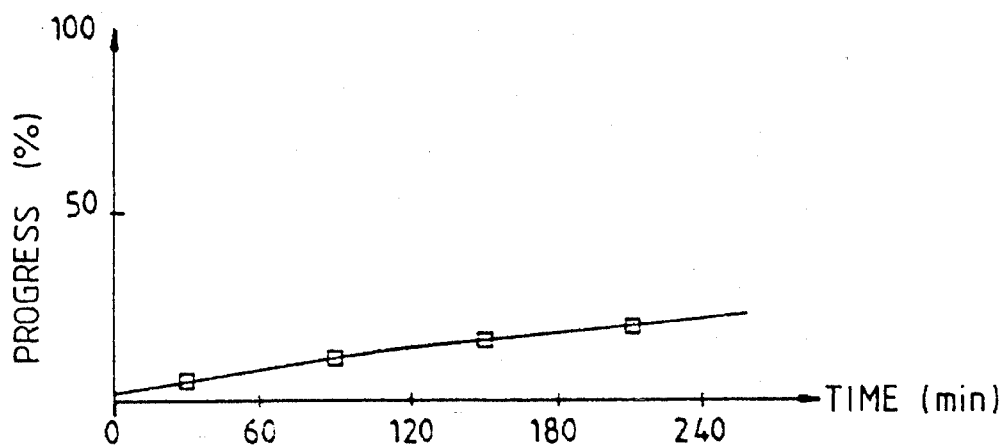
FIG. 2a illustrates the degree of progress of a reaction of chemical conversion of the functional groups (Y) into functional groups (X), as a function of time, in considering all the reactive functional groups (Y)

The progress of this reaction can be followed by Fourier Transform Infrared (FTIR) analysis which expresses the chemical modifications throughout the thickness of a polymer film, namely the conversion of the alcohol functional groups into ester functional groups. In FIG. 2a, which shows the progress of the reaction (IR analysis measurements having been carried out on polymer films placed before an acid chloride gas during increasingly lengthy periods), it can be seen that at the end of 200 minutes only 20% of the OH functional groups have reacted. Thus, many of the functional groups in volume have not been modified.

Figure 2B:
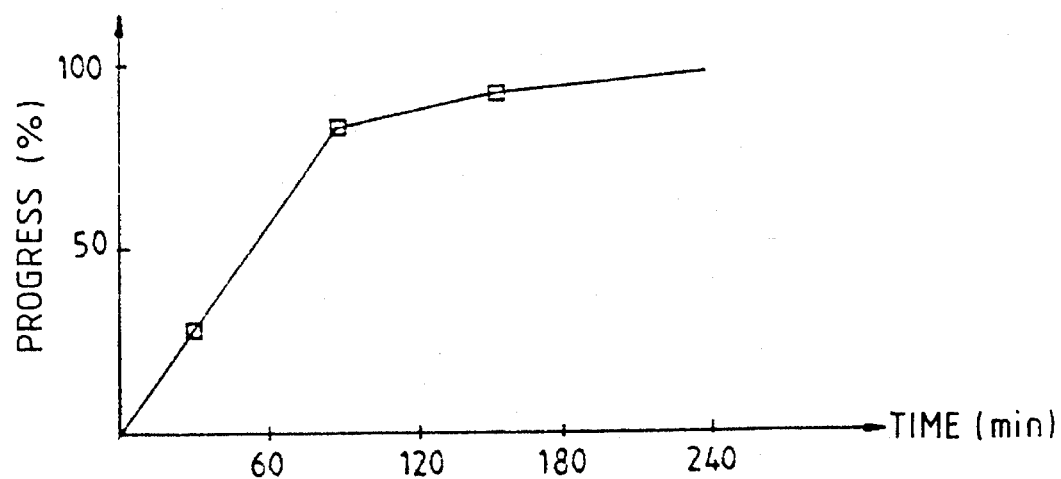
FIG. 2b illustrates the degree of progress of the same reaction of chemical conversion of the functional groups (Y) into functional groups (X), as a function of time, in considering the surface functional groups (Y).

The second analysis carried out on the same polymer film enclosing OH functional groups, on which a drop of glycerol is placed, is shown in FIG. 2b. The drop of glycerol forms an angle θ with the plane of the film. At the end of variable periods of reaction, the angle increases, reflecting the increasingly hydrophobic character of the surface of the polymer film having ester functions on the surface. While the angles recorded are initially an angle of 50° and, at the end of a very long period of time, an angle of 57°, this angle of 57° is practically reached at the end of two hours: this is shown in FIG. 2b which shows a schematic view of the progress of the conversion of the alcohol functional groups into ester functional groups on the surface.

In conclusion, a film placed in contact for about two hours with of an acid chloride gas shows a large number of ester surface functional groups while, in volume alone, 10% of the functional groups are ester functional groups. This validates the conversion of the surface functional groups (Y) into functional groups (x).

EXAMPLE 2

In a cell constituted by two transparent conductive substrates (glass or polyester covered with indium tin oxide) separated by 23 μm thickness shims, the same mixture as in the example 1 is introduced, irradiation is carried out in the same way and the liquid crystal is eliminated under vacuum.

The network is put into contact with the following mixture for 40 minutes:

10 mmol of benzoic para-butyl acid chloride;

10 mmol of triethyl amine;

20 ml of ether.

The network is then rinsed in water, vacuum dried and filled with the liquid crystal BL012.

What is claimed is:

1. An electro-optic composite material comprising a polymer network having pores distributed therethroughout and liquid crystal molecules within said pores,
    wherein said polymer has chemical functional groups (Y) within the network and different second chemical functional groups (X) at the liquid crystal/polymer interface in the pores thereof.

2. An electro-optical material according to claim 1, wherein the first functional groups (Y) are alcohols.

3. An electro-optical material according to claim 2, wherein the second functional groups (X) are esters.

4. An electrical device comprising an electro-optical composite material according to one of claims 2 or 3.

5. A display screen comprising an electro-optical composite material according to one of the claims 2 to 3.

* * * * *